Patented Sept. 12, 1944

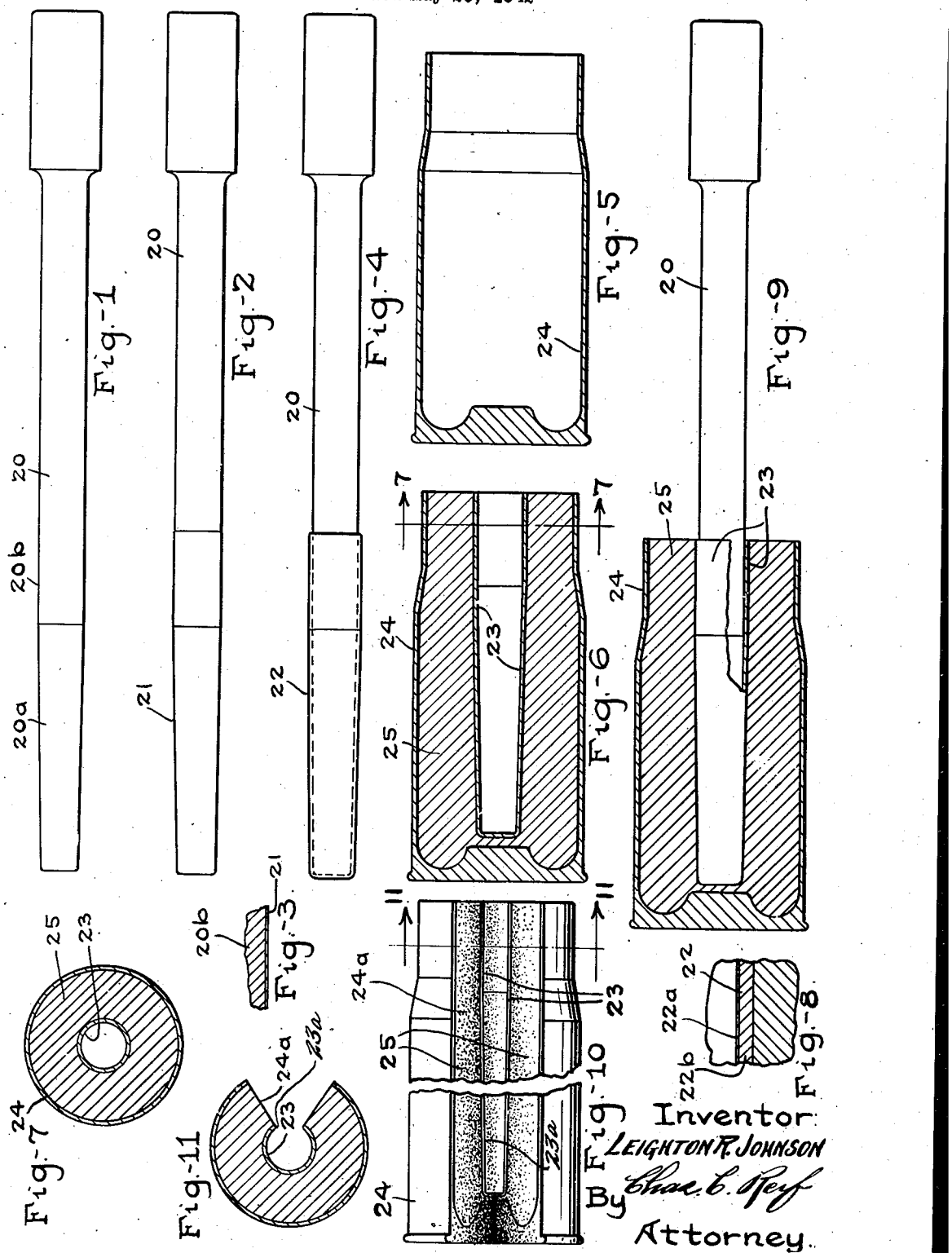
Sept. 12, 1944.　　　L. R. JOHNSON　　　2,358,232
GAUGE AND METHOD OF MAKING SAME
Filed May 26, 1942
Inventor
LEIGHTON R. JOHNSON
By Chas. C. Neyf
Attorney.

2,358,232

UNITED STATES PATENT OFFICE 2,358,232

GAUGE AND METHOD OF MAKING THE SAME

Leighton R. Johnson, Minneapolis, Minn.

Application May 26, 1942, Serial No. 444,529

6 Claims. (Cl. 76—101)

This invention relates to a gauge and method of making the same, and particularly to a gauge for certain tools such as a tapered or cylindrical tool.

While the invention might be applicable to various kinds of tools, in the embodiment of the same illustrated it is shown as applied to a tool such as a tapered punch. Such punches are used in large numbers in certain ammunition factories and other plants and there is usually a large number of different sizes. A gauge for such a punch comprises a tapered socket and to make such a gauge on the machine tools available for the purpose is a difficult operation and one requiring quite a little time. It is difficult to get the socket of the required size and precision.

It is an object of this invention to provide a very efficient gauge and a simple and rapid method of making the same.

It is a further object of the invention to provide a very efficient and accurate gauge which comprises a socket or tapered socket which is made without the use of machine tools.

It is another object of the invention to provide a very accurate and efficient gauge which is made by plating metal upon the tool for which the gauge is made.

It is still another object of the invention to provide a very accurate gauge and a rapid method of making the same by the electro-plating process, which gauge may have the required tolerance.

These and other objects and advantages of the invention will be fully set forth in the following description made in connection with the accompanying drawing in which like reference characters refer to similar parts throughout the several views and in which:

Fig. 1 is a view in side elevation of a punch for which the gauge is made;

Fig. 2 is a view in side elevation of said punch after one step of the method has been performed;

Fig. 3 is a partial vertical section through a portion of the punch shown in Fig. 2 and shown on quite an enlarged scale;

Fig. 4 is a view in side elevation of the punch after a further step of the method has been performed thereon;

Fig. 5 is a central vertical section through a shell or casing used;

Fig. 6 is a central vertical section through the gauge enclosed in a casing;

Fig. 7 is a vertical section taken on line 7—7 of Fig. 6;

Fig. 8 is a partial vertical section through the punch shown in Fig. 4 and shown on quite an enlarged scale;

Fig. 9 is a view similar to Fig. 6 showing the punch in the gauge;

Fig. 10 is a view in side elevation of the finished gauge; and

Fig. 11 is a vertical section taken on line 11—11 of Fig. 10.

Referring to the drawing a method is illustrated for making a gauge for a tool such as shown in Fig. 1. It is usually desired to have a gauge with some tolerance or in other words, to have the gauge somewhat larger than the tool with which it is used. It is a rather common practice to permit the finished tool to vary two or three ten-thousandths of an inch from the standard tool. In making the gauge with tolerance the tool 20 shown in Fig. 1, having the tapered end 20a and the adjacent cylindrical portion 20b is first plated by the electro-plating process to place a very thin plating 21 on the operative end of the tool. This layer is usually of copper although other metals such as chromium might be used. The layer 21 of plating is made a permanent layer, or one which cannot be bodily removed from the tool. Such electro-plating is usually done with a current of high voltage and low amperage. The coating 21 is quite thin. Such coating can be made practically one-millionth of an inch in thickness. In practice however, the thickness would vary according to the tolerance desired in the gauge. A layer with a thickness of one-half of a ten-thousandth of an inch would be a good example.

After the coating 21 has been applied another layer 22 of metal is plated on the coating 21 and this plating will be of the removable type such as commonly used in electro-typing. This is done with a current of low voltage and high amperage. Preferably an initial thin coating of nickel is first applied and then copper is applied to make a coating of substantial thickness so that a shell 23 is formed. The shell 23 comprises both the thin nickel and the heavier copper layer which become integral and are removed together. The thin coat of metal 21 which is used for tolerance is shown in a rather exaggerated form in Fig. 3. In Fig. 8 the coating 22 is shown in enlarged or exaggerated form and comprises the thin nickel portion 22a and the thicker copper portion 22b. After the coating 22 has been applied to form the shell 23 the punch or tool 20 can be removed and the shell 23 can be used as a gauge or placed in any suitable holder to be used as a gauge. One convenient form of holder is to use a casing or shell 24 such as shown in Fig. 5. The shell 23 with or without the tool 20 therein is placed centrally within the shell 24 and some substance 25 adapted to harden in fluid or semi-fluid form is placed about the shell 23 filling the casing 24. Material 25 when hardened, thus forms a very effective holding means for shell 23. In practice the material 25 has been of the electro-typing metal but various substances could be used such as hard resin, plaster of Paris, etc. After the shell 23 is thus secured in casing 24 by the material 25 the shell 23 and casing 24 with the material therein is preferably cut so that a segment is removed therefrom as shown in Fig. 11. When the tool is placed in the gauge the fit of the tool can be nicely observed along the line 23a formed by the inner wall of shell 23 and the side 24a of the cut-away shell and material 24.

With the described method a very accurate and in fact, a practically perfect gauge is produced and the gauge is produced without the use of any machine tools in making the socket in shell 23. The desired tolerance can be had by varying the thickness of the layer 21. If no tolerance is desired in the gauge then the coating 22 would be placed directly on the tool 20 and would be of the removable type. It will be understood of course, that if the particular tool used in making the gauge is to be further used in practice the coating 21 could be ground therefrom. The gauge of course, will be used for a multiplicity of other tools which should have the dimensions of the tool 20.

From the above description it will be seen that I have produced a very accurate gauge and a method of making the same by means of which the gauge can be very rapidly produced. The time used in making the gauge is only a small fraction of that which would be required to produce a gauge of steel or other metal on the regular or ordinary machine tools. The gauges of the invention can thus be rapidly and inexpensively made for all the punches or other tools for which they are desired. A great saving in labor is thus effected and a more accurate gauge produced by the method of the invention than could probably be produced by other methods.

It will of course, be understood that various changes may be made in the form, details, arrangement and proportions of the parts and in the steps and sequence of steps of the method, without departing from the scope of applicant's invention, which generally stated, consists in a method and device capable of carrying out the objects above set forth, in the parts and combinations of parts disclosed and defined in the appended claims.

What is claimed is:

1. The method of making a gauge for a tool of general tapered or cylindrical form which consists in plating a very thin permanent coating of metal on said tool, then plating a removable metallic coating on said tool of appreciable thickness to form a shell and removing said shell from said tool to be used as a gauge whereby the thickness of said permanent coating on said tool will give a certain tolerance in said gauge.

2. The method of making a gauge for a tool which consists in plating a removable metallic coating on said tool of appreciable thickness to form a shell, embedding said shell in a substance adapted to harden to form a holder for said shell and cutting away a portion of said shell and holder along a longitudinal line to expose the interior of said shell so that the same can be used as a gauge.

3. The method of making a gauge for a tool of tapered or cylindrical form which consists in plating a removable metallic coating on said tool of appreciable thickness to form a shell, embedding said shell in a holder and removing said shell from said tool, then cutting a segment from said shell and holder whereby the same forms a gauge in which the fit of the tool can be observed.

4. The method of making a gauge for a tool of general tapered or cylindrical form which consists in plating a removable metallic coating on said tool of appreciable thickness to form a shell and removing said shell from said tool to be used as a gauge, cutting away a portion of said shell along a longitudinal line so that the fit of a tool in said gauge can be observed along said line.

5. The method of making a gauge for a tool of tapered or cylindrical form which consists in plating on said tool a removable thin coating of nickel, then plating on said nickel a coating of copper of appreciable thickness whereby said nickel and copper form a shell and removing said shell and using the same as a gauge, embedding said shell in a substance adapted to harden to form a holder or casing and cutting a segment from said shell and casing to form a gauge in which the tool can be observed.

6. A gauge for a tool comprising a tubular shell having an inner very thin layer of nickel and an outer much thicker layer of copper secured thereon, said shell having a portion cut away along a longitudinal element and a radial plane so that the fit of a tool placed therein can be observed.

LEIGHTON R. JOHNSON.